United States Patent
Lin et al.

(10) Patent No.: US 12,115,445 B2
(45) Date of Patent: Oct. 15, 2024

(54) CONTROL DEVICE AND CORRECTING METHOD OF CONTROL DEVICE WITH STRENGTH FEEDBACK FUNCTION

(71) Applicant: HTC Corporation, Taoyuan (TW)

(72) Inventors: Lun-Kang Lin, Taoyuan (TW); I-Han Tai, Taoyuan (TW)

(73) Assignee: HTC Corporation, Taoyuan (TW)

( * ) Notice: Subject to any disclaimer, the term of this patent is extended or adjusted under 35 U.S.C. 154(b) by 288 days.

(21) Appl. No.: 17/950,114

(22) Filed: Sep. 22, 2022

(65) Prior Publication Data
US 2024/0100418 A1    Mar. 28, 2024

(51) Int. Cl.
*A63F 13/285*    (2014.01)
*G06F 3/01*    (2006.01)

(52) U.S. Cl.
CPC ............ *A63F 13/285* (2014.09); *G06F 3/016* (2013.01); *A63F 2300/1037* (2013.01)

(58) Field of Classification Search
CPC . A63F 13/285; A63F 2300/1037; G06F 3/016
See application file for complete search history.

(56) References Cited

U.S. PATENT DOCUMENTS

| | | | | |
|---|---|---|---|---|
| 6,001,014 A | * | 12/1999 | Ogata | A63F 13/285 463/37 |
| 7,774,155 B2 | * | 8/2010 | Sato | A63F 13/428 345/169 |

FOREIGN PATENT DOCUMENTS

| | | |
|---|---|---|
| CN | 103776464 | 5/2014 |
| CN | 115087846 | 9/2022 |

OTHER PUBLICATIONS

"Office Action of Taiwan Counterpart Application", issued on Jan. 19, 2023, p. 1-p. 11.

* cited by examiner

*Primary Examiner* — Reginald A Renwick
(74) *Attorney, Agent, or Firm* — JCIPRNET (57) ABSTRACT

A control device and a correcting method of a control device with a strength feedback function are disclosed. The control device includes a vibrator, a driver, a strength sensor, and a processor. In correction procedures, the driver provides a driving signal with a plurality of different setting voltage values respectively to the vibrator. In each correction procedure, the driver adjusts a frequency of the driving signal to setting frequency values by time division. In the correction procedures, the strength sensor senses a strength generated by a vibration of the vibrator to obtain strength sensing information respectively corresponding to the setting voltage values. The processor analyzes the strength sensing information, the setting frequency values, and the setting voltage values to obtain relationship information between the setting frequency values and the setting voltage values corresponding to each strength sensing information.

14 Claims, 6 Drawing Sheets

| | Setting voltage value A1 | Setting voltage value A1.5 | Setting voltage value A2 | Setting voltage value A2.5 | Setting voltage value A3 | Setting voltage value A3.5 | Setting voltage value A4 |
|---|---|---|---|---|---|---|---|
| Setting frequency value f1 | 0.1 (G) | 0.15 (G) | 0.2 (G) | 0.3 (G) | 0.4 (G) | 0.45 (G) | 0.5 (G) |
| Setting frequency value f2 | 0.2 (G) | 0.25 (G) | 0.3 (G) | 0.39 (G) | 0.48 (G) | 0.5 (G) | 0.52 (G) |
| Setting frequency value f3 | 0.22 (G) | 0.31 (G) | 0.4 (G) | 0.37 (G) | 0.33 (G) | 0.42 (G) | 0.51 (G) |
| Setting frequency value f4 | 0.31 (G) | 0.32 (G) | 0.33 (G) | 0.47 (G) | 0.6 (G) | 0.59 (G) | 0.57 (G) |
| Setting frequency value f5 | 0.47 (G) | 0.34 (G) | 0.2 (G) | 0.18 (G) | 0.16 (G) | 0.33 (G) | 0.59 (G) |

CONTROL DEVICE AND CORRECTING METHOD OF CONTROL DEVICE WITH STRENGTH FEEDBACK FUNCTION

BACKGROUND OF THE INVENTION

Field of the Invention

The invention relates to a control device and a correcting method, in particular to a control device capable of outputting a fixed strength and a correcting method of a control device with a strength feedback function.

Description of Related Art

A game console may generate vibration effects at different frequencies via a control device such as a joystick, a handlebar, or a wearable device for players to experience game content. Generally speaking, the control device may generate vibration via a vibrator. During vibration, a plurality of elements in the vibrator are in contact with each other, resulting in normal physical phenomena such as force being dispersed and energy being consumed, causing the strength received by the player to be inconsistent with the setting strength of the vibrator. However, the current vibrator only adjusts the vibration effect of the hardware elements of the vibrator, so that the software applied to the vibrator may not be applied to the previous adjustment after being updated. As a result, the magnitude of the vibration strength felt by the player is varied with the electrical energy and/or the vibration frequency of the control device, resulting in a poor feeling for the strength by the user.

SUMMARY OF THE INVENTION

An embodiment of the invention provides a control device and a correcting method of a control device with a strength feedback function that may correct the output strength of the control device to improve the accuracy and consistency of a user's feeling of strength.

A control device of an embodiment of the invention has a strength feedback function. The control device includes a vibrator, a driver, a strength sensor, and a processor. The driver is coupled to the vibrator. In a plurality of correction procedures, the driver provides a driving signal with a plurality of different setting voltage values respectively to the vibrator. In each of the correction procedures, the driver adjusts a frequency of the driving signal to a plurality of setting frequency values by time division. In the correction procedures, the strength sensor senses a strength generated by a vibration of the vibrator to obtain a plurality of strength sensing information respectively corresponding to the setting voltage values. The processor is coupled to the driver and the strength sensor. The processor analyzes the strength sensing information, the setting frequency values, and the setting voltage values to obtain relationship information between the setting frequency values and the setting voltage values corresponding to each of the strength sensing information.

An embodiment of the invention further provides a correcting method of a control device with a strength feedback function. The correcting method includes the following steps. A driving signal with a plurality of different setting voltage values is respectively provided to a vibrator in a plurality of correction procedures. A frequency of the driving signal is adjusted to a plurality of setting frequency values by time division in each of the correction procedures. A strength generated by the vibration of the vibrator is sensed to obtain a plurality of strength sensing information corresponding to the setting voltage values. The strength sensing information, the setting frequency values, and the setting voltage values are analyzed to obtain relationship information between the setting frequency values and the setting voltage values corresponding to each of the strength sensing information.

Based on the above, the control device and the correcting method of the control device with the strength feedback function of an embodiment of the invention can, in the plurality of correction procedures, sense the plurality of strengths corresponding to the driving signal with different setting voltage values and different setting frequency values via the strength sensor, and obtain the relationship between the setting voltage values and the setting frequency values corresponding to the setting strength (i.e., the strength sensing information) according to the setting values and the sensing results via the processor. Therefore, the control device may be set according to the strength sensing information, so that the output strength value is a constant value at different electrical energies and/or vibration frequencies, so as to improve the accuracy and consistency of the user's feeling of strength.

In order to make the aforementioned features and advantages of the disclosure more comprehensible, embodiments accompanied with figures are described in detail below.

DESCRIPTION OF THE EMBODIMENTS

A portion of the embodiments of the invention is described in detail hereinafter with reference to figures. In the following, the same reference numerals in different figures should be considered to represent the same or similar elements. The embodiments are only a portion of the disclosure and do not disclose all of the possible implementations of the disclosure. More precisely, these embodiments are only examples in the claims of the invention.

Figure 1:
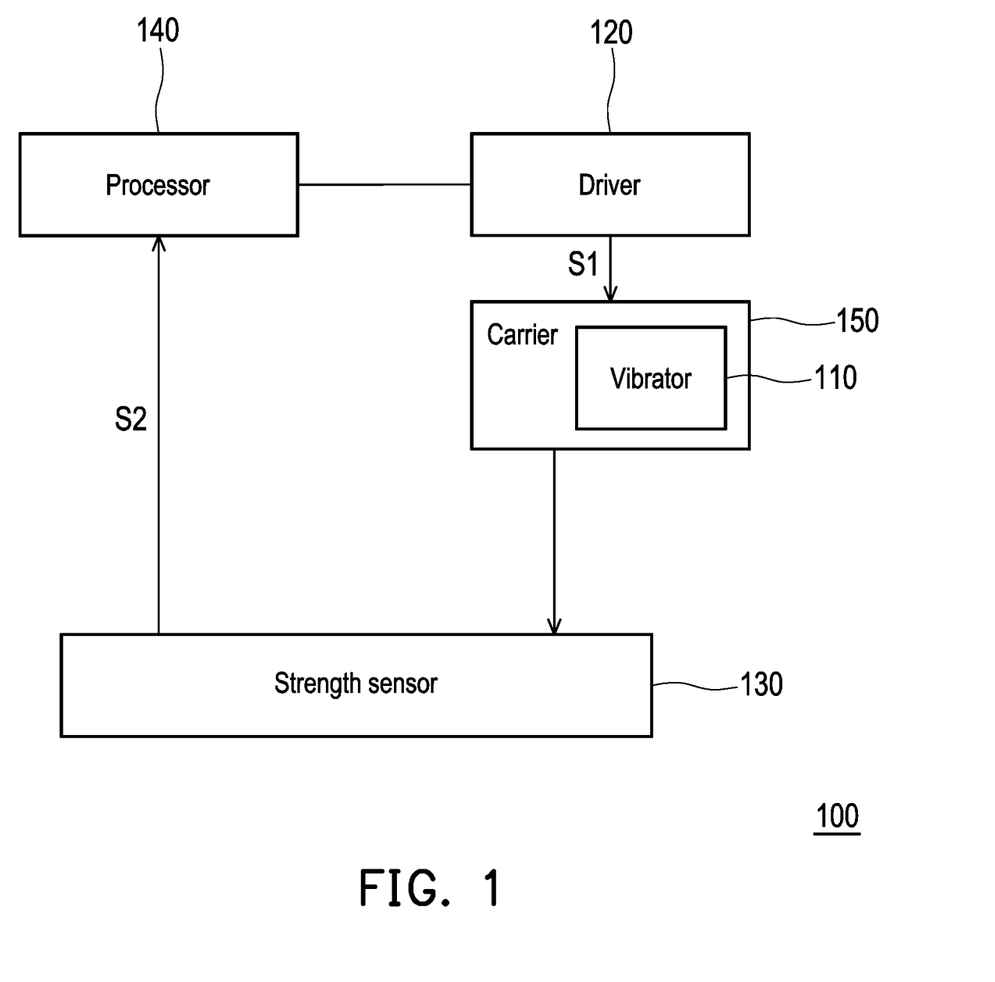
FIG. 1 is a block diagram of a control device shown according to an embodiment of the invention.

FIG. 1 is a block diagram of a control device shown according to an embodiment of the invention. Please refer to FIG. 1, a control device 100 may be, for example, an electronic device with a power feedback function. In the present embodiment, the control device 100 may be applied in games and implemented by a handle, a joystick, a steering wheel, a mouse, or a wearable device.

In the embodiment of FIG. 1, the control device 100 includes a vibrator 110, a driver 120, a strength sensor 130, and a processor 140. The driver 120 is coupled to the vibrator 110. The vibrator 110 is coupled to the strength sensor 130. The processor 140 is coupled to the driver 120 and the strength sensor 130.

In the present embodiment, the vibrator 110 may be controlled by the driver 120 to generate vibration according to a driving signal S1 provided by the driver 120. The vibration may have a set vibration frequency in relation to the driving signal S1 and may generate a set strength.

In the present embodiment, the driver 120 may be controlled by the processor 140 to be activated or deactivated according to a command provided by the processor 140. The driver 120 may also provide the driving signal S1 with a setting voltage value and a setting frequency value to the vibrator 110 according to the command provided by the processor 140.

In the present embodiment, the strength sensor 130 may be controlled by the processor 140 to be activated or deactivated according to a command provided by the processor 140. The strength sensor 130 may also sense the strength generated by the vibrator 110.

In the present embodiment, the processor 140 may be, for example, a field-programmable gate array (FPGA), a central processing unit (CPU) or other programmable microprocessors for conventional use or special use, a digital signal processor (DSP), a programmable controller, an application-specific integrated circuit (ASIC), a programmable logic device (PLD), other similar devices, or a combination of the devices capable of loading and executing relevant firmware or software to implement control and computing functions.

Figure 2:
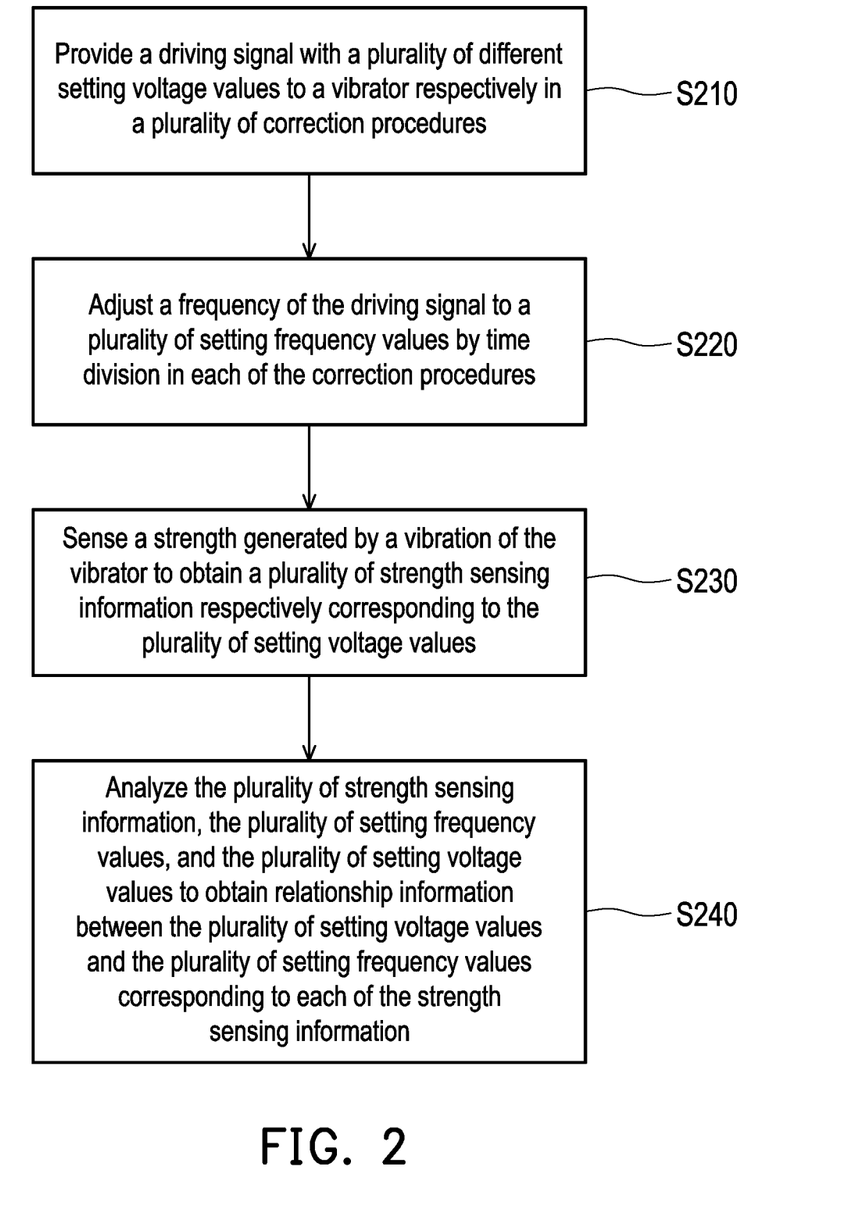
FIG. 2 is a flowchart of a correcting method shown according to an embodiment of the invention.

FIG. 2 is a flowchart of a correcting method shown according to an embodiment of the invention. Please refer to FIG. 1 and FIG. 2, the control device 100 may execute the following steps S210 to S240 to execute the correcting method. In the present embodiment, the correcting method is applicable to the control device 100 with the strength feedback function, so as to set the output strength value of the control device 100 via a plurality of correction procedures.

In step S210, in a plurality of correction procedures, the driving signal S1 with a plurality of different setting voltage values is respectively provided to the vibrator 110 via the driver 120. That is, in each of the correction procedures, the driver 120 may provide the driving signal S1 with a setting (or fixed) voltage value to the vibrator 110. In the present embodiment, the setting voltage value is related to the electric energy used to drive the vibrator 110.

In step S220, in each of the correction procedures, the frequency of the driving signal S1 is adjusted to a plurality of setting frequency values by time division via the driver 120. That is, in each of the correction procedures, corresponding to a single setting voltage value, the driver 120 may make the driving signal S1 have different setting frequency values in a plurality of time sequences. In the present embodiment, the setting frequency values may be related to the vibration frequency of the vibrator 110 when the vibrator 110 vibrates.

In step S230, in the plurality of correction procedures, the strength generated by the vibration of the vibrator 110 is sensed via the strength sensor 130 to obtain a plurality of strength sensing information S2 corresponding to the plurality of setting voltage values respectively. For example, in the first correction procedure, the vibrator 110 may make the driving signal S1 have a first setting voltage value, and adjust the driving signal S1 to have a plurality of setting frequency values by time division, so as to drive the vibrator 110 to vibrate to different degrees.

Correspondingly, in each of the correction procedures, the strength sensor 130 may sense the vibration generated by the vibrator 110 to correspondingly obtain the plurality of strength sensing information S2 respectively.

In the present embodiment, the strength sensing information S2 may be an output strength value generated by the vibration of the vibrator 110. In the present embodiment, the strength sensing information S2 may include a physical quantity used to express strength, such as a value represented by gravitational acceleration (G).

In step S240, after the plurality of correction procedures, the plurality of strength sensing information S2, the plurality of setting frequency values, and the plurality of setting voltage values are analyzed via the processor 140 to obtain corresponding relationship information between the plurality of setting voltage values and the plurality of setting frequency values corresponding to each of the strength sensing information S2. In other words, the processor 140 calculates the setting data (including the plurality of setting voltage values and the plurality of setting frequency values) executed in each of the correction procedures and the sensed data (including the plurality of strength sensing information S2) to obtain the relationship between each of the strength sensing information S2 and the plurality of setting voltage values and the plurality of setting frequency values.

In some embodiments, the processor 140 may calculate the relationship between the plurality of setting voltage values and the plurality of strength sensing information S2 based on each of the setting frequency values. The processor 140 may also calculate the relationship between the plurality of setting frequency values and the plurality of strength sensing information S2 based on each of the setting voltage values.

In the present embodiment, the relationship information may be, for example, a recursive relationship equation with the setting voltage values, the setting frequency values, and/or the strength sensing information S2 as parameters. In some embodiments, the relationship information may be, for example, a lookup table or other relationship equations with the setting voltage values, the setting frequency values, and/or the strength sensing information S2 as parameters.

It should be mentioned that, in each of the correction procedures, different setting frequency values and the corresponding strength sensing information S2 are obtained at fixed setting voltage values via the processor 14, and after the plurality of correction procedures, the corresponding setting frequency values and the corresponding strength sensing information S2 at different setting voltage values are obtained via the processor 14. In this way, the relationship between the setting voltage values and the setting frequency values corresponding to the fixed output strength value (i.e., the strength sensing information S2) may be obtained by analyzing the plurality of information via the processor 140. Therefore, the control device 100 may be set according to the strength sensing information S2, so that the output strength value is not affected by hardware elements (for example, the specifications of the vibrator 110). In addition, the control device 100 may adjust the setting voltage values and set the generated output strength value to a constant value at different vibration frequencies, so as to improve the accuracy and consistency of the user's feeling of strength.

Referring to FIG. 1 again, in the present embodiment, the control device 100 may include a carrier 150. The carrier 150 may accommodate the vibrator 110. The carrier 150 may provide strength when the vibrator 110 vibrates, so as to sense the strength via the strength sensor 130 to generate the force sensing information S2.

Figure 3:
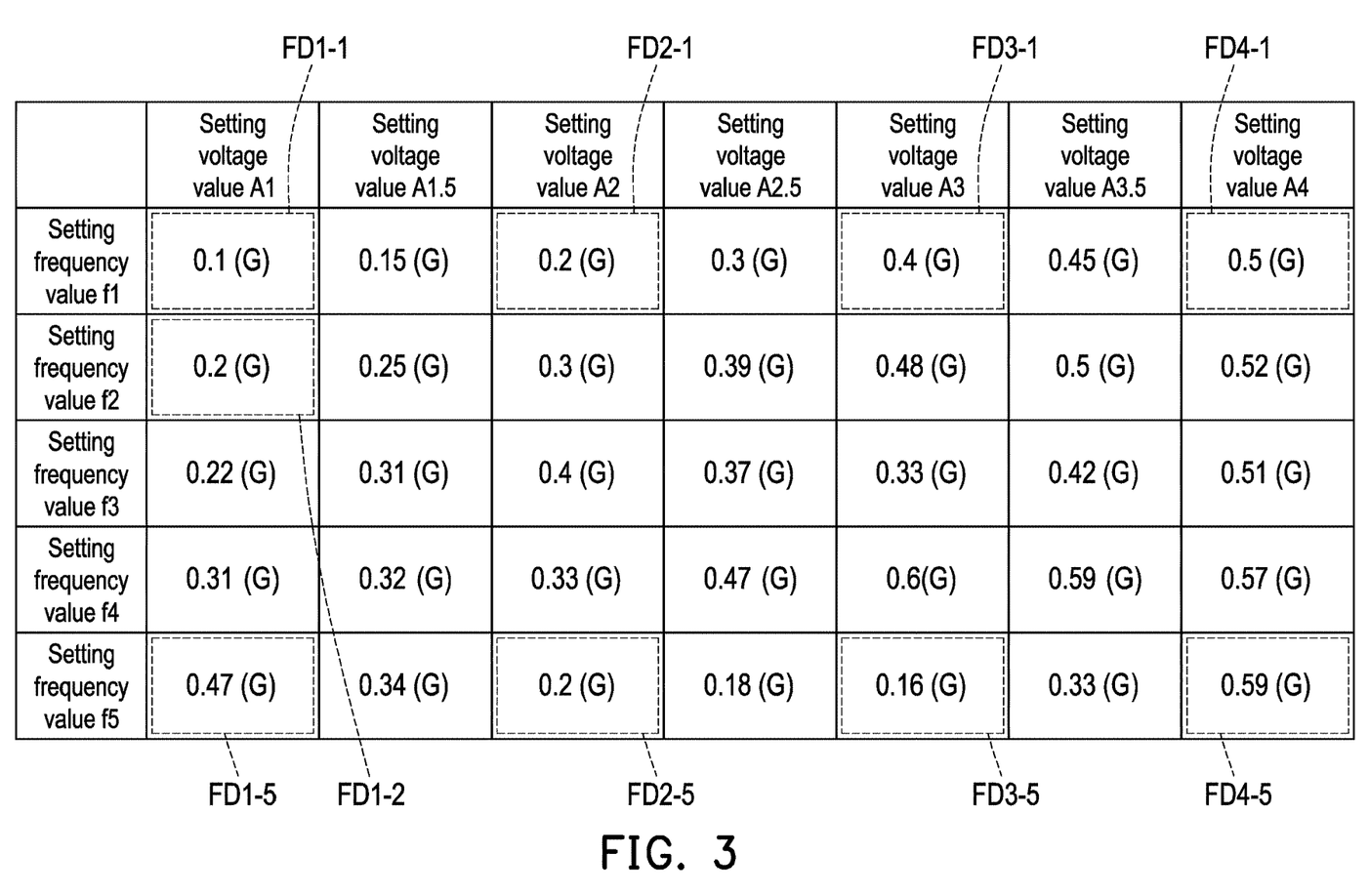
FIG. 3 is a schematic diagram of the operation of the control device shown according to the embodiment of FIG. 1 of the invention.

FIG. 3 is a schematic diagram of the operation of the control device shown according to the embodiment of FIG. 1 of the invention. In FIG. 3, the first row is the setting voltage values of the driving signal S1, and the first column is the setting frequency values of the driving signal S1. The other columns and rows of FIG. 3 correspond to the strength sensing information sensed by the setting voltage values and the setting frequency values. The content shown in FIG. 3 may be obtained by executing the following steps via a control device 300.

Referring to FIG. 1 and FIG. 3, in the present embodiment, in the first timing sequence of the first correction procedure, the driving signal S1 may have a first setting voltage value (i.e., a setting voltage value A1) and a first setting frequency value (i.e., a setting frequency value f1). At this time, strength sensing information FD1-1 may be 0.1 (the unit is, for example, the gravitational acceleration (G)). In the second timing sequence of the first correction procedure, the driving signal S1 may have the first setting voltage value (i.e., the setting voltage value A1) and a second setting frequency value (i.e., a setting frequency value f2). At this time, strength sensing information FD1-2 may be 0.2 (G), and so on. That is, in other time sequences of the first correction procedure, the driving signal S1 may have the first setting voltage value (i.e., the setting voltage value A1) and different setting frequency values (i.e., the setting frequency value f1 to a setting frequency value f5) to obtain a plurality of corresponding strength sensing information FD1-1 to FD1-5.

Figure 4A:
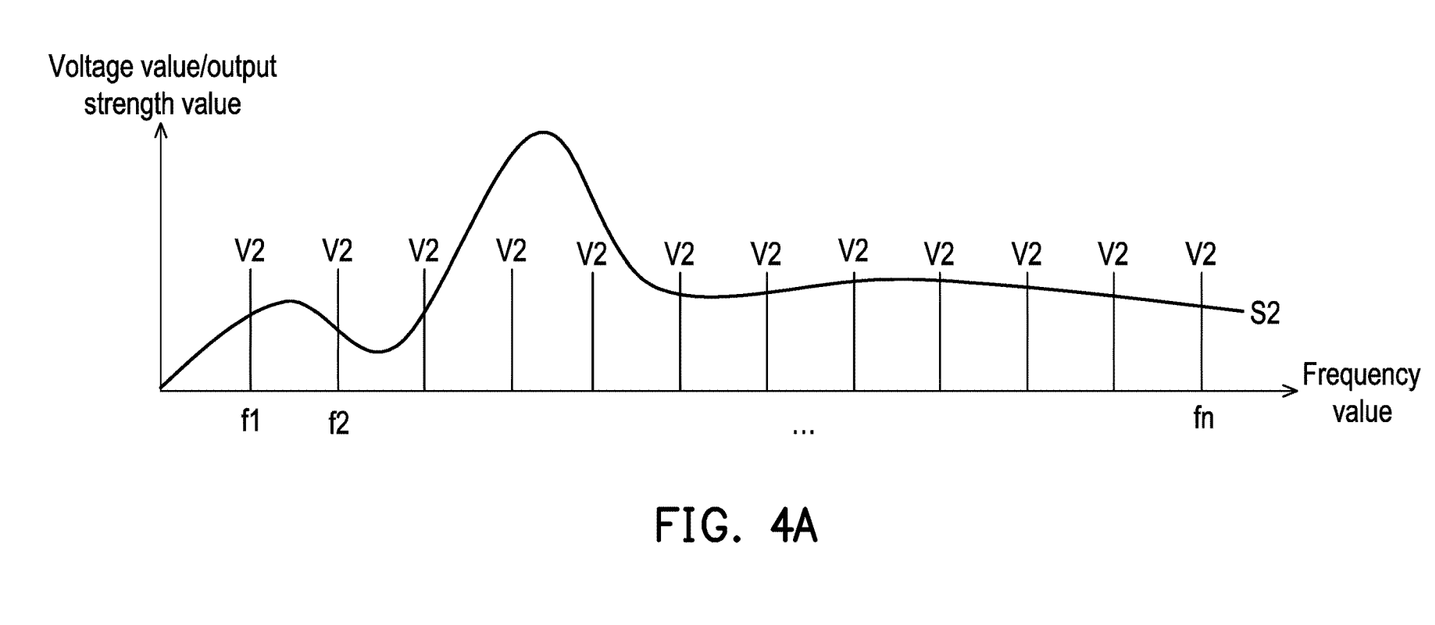
FIG. 4A is a schematic diagram of the operation of the control device in a correction procedure shown according to the embodiment of FIG. 1 of the invention.

Referring to FIG. 4A at the same time, FIG. 4A is a schematic diagram of the operation of the control device in a correction procedure shown according to the embodiment of FIG. 1 of the invention. In FIG. 4A, the horizontal axis is the setting frequency value of the driving signal S1, and the vertical axis is the setting voltage value of the driving signal S1 and/or the output strength value of the strength sensing information S2. In the first correction procedure, the driving signal S1 may be implemented by a pulse signal. The driving signal S1 may have the setting voltage value A1 (i.e., a voltage value V2) and different setting frequency values (i.e., setting frequency values f1, f2 . . . fn). At this time, the strength sensing information S2 may include different output strength values corresponding to the different setting frequency values f1 to fn represented by curves.

In the present embodiment, in the second correction procedure, the driving signal S1 may have a second setting voltage value (i.e., a setting voltage value A2) and different setting frequency values (i.e., the setting frequency value f1 to the setting frequency value f5) to obtain a plurality of corresponding strength sensing information FD2-1 to FD2-5. In the third correction procedure, the driving signal S1 may have a third setting voltage value (i.e., a setting voltage value A3) and different setting frequency values (i.e., the setting frequency value f1 to the setting frequency value f5) to obtain a plurality of corresponding strength sensing information FD3-1 to FD3-5. The units of setting voltage values A1 to A4, the setting frequency values f1 to f5, and the strength sensing information of the embodiment of FIG. 3 may be determined by the designer, and the numbers and values thereof are only examples and are not limited thereto.

In the present embodiment, after a plurality of correction procedures (for example, from the first correction procedure to the fourth correction procedure), a plurality of regression equations are respectively set corresponding to the plurality of setting frequency values via the processor 140. In the present embodiment, a plurality of coefficients of each of the regression equations are calculated according to the plurality of strength sensing information corresponding to each of the setting frequency values at the plurality of setting voltage values via the processor 140.

Specifically, in the present embodiment, for the setting frequency value f1, the processor 140 may establish a first regression equation according to a plurality of setting voltage values and a plurality of corresponding strength sensing information. The setting voltage values and the strength sensing information include the setting voltage value A1 and the corresponding strength sensing information FD1-1 (i.e., 0.1G), the setting voltage value A2 and the corresponding strength sensing information FD2-1 (i.e., 0.2G), the setting voltage value A3 and the corresponding strength sensing information FD3-1 (i.e., 0.4G), and the setting voltage value 4 and corresponding strength sensing information FD4-1 (i.e., 0.5G).

In the present embodiment, the first regression equation may be, for example, the equation $G=a1x^2+b1x+c1$. In the first regression equation, G is the strength sensing information (i.e., the reading sensed by the strength sensor 130). x is the setting voltage value. a1, b1, and c1 are a plurality of coefficients with respect to the setting frequency value f1.

Continuing the above description, for the setting frequency value f1, the processor 140 may substitute the plurality of strength sensing information and the corresponding setting voltage values A1 to A4 into the first regression equation to solve the plurality of coefficients a1, b1, and c1 in the first regression equation. It should be noted that the quantity of the strength sensing information and the corresponding setting voltage values is equal to or greater than the quantity of the coefficients of the regression equations for solving the coefficients of the regression equations. The regression equation of the present embodiment is only an example, and is not limited thereto.

In addition, for the setting frequency value f2, the processor 140 may establish a second regression equation according to a plurality of setting voltage values and a plurality of corresponding strength sensing information. The setting voltage values and the strength sensing information include the setting voltage value A1 and the corresponding strength sensing information (i.e., 0.2G), the setting voltage value A2 and the corresponding strength sensing information (i.e., 0.3G), the setting voltage value A3 and the corresponding strength sensing information (i.e., 0.48G), and the setting voltage value A4 and the corresponding strength sensing information (i.e., 0.52G).

In the present embodiment, the second regression equation may be, for example, the equation $G=a2x^2+b2x+c2$. The second regression equation may be deduced by referring to the relevant description of the first regression equation, and is therefore not repeated herein.

That is, in the present embodiment, the processor 140 may obtain a plurality of regression equations for different setting frequency values (e.g., the setting frequency value f1 to the setting frequency value f5) respectively. Each of the regression equations represents the relationship between the setting voltage values and the strength sensing information at a fixed setting frequency value.

In the present embodiment, after a plurality of regression equations are obtained, a plurality of coefficients respectively corresponding to the regression equations are stored via the processor 140 to obtain a correction matrix. In the present embodiment, the correction matrix may be stored in a memory (not shown) of the control device 100.

In the present embodiment, a plurality of setting voltage values are generated according to a plurality of setting ratios based on a reference voltage (e.g., the setting voltage value A1) via the processor 140, respectively. Specifically, in the present embodiment, based on the setting voltage value A1, the processor 140 may generate a setting voltage value A1.5 according to the first setting ratio, and generate a setting voltage value A2.5 according to the second setting ratio, and so on.

In the present embodiment, the plurality of setting ratios may be, for example, numerical values arranged in an arithmetic progression. That is, the magnitudes corresponding to the setting voltage value A1 to the setting voltage value A4 may be sequentially increased by the same magnification. In some embodiments, the plurality of setting ratios may be, for example, numerical values arranged in a proportional sequence or other geometric progressions.

In the present embodiment, via the processor 140, a plurality of setting voltage values (for example, the setting voltage value A1.5, the setting voltage value A2.5, and a setting voltage value A3.5) are respectively introduced into the plurality of regression equations to obtain a plurality of corresponding strength sensing information. That is, the strength sensing information is an estimated value calculated according to the regression equations.

In the present embodiment, after the table shown in FIG. 3 is created, the output strength value is calculated according to the median of the plurality of strength sensing information via the processor 140. In other words, the processor 140 may calculate all the strength sensing information in the table to obtain the median of the strength sensing information, and the processor 140 sets the median of the strength sensing information as the strength sensing information (i.e., the output strength value) preset by the control device 100 upon leaving the factory. In some embodiments, the median may be replaced by the mean or other statistical values.

In the present embodiment, each of the setting voltage values corresponding to the output strength value is calculated at each of the setting frequency values via the processor 140.

Figure 4B:
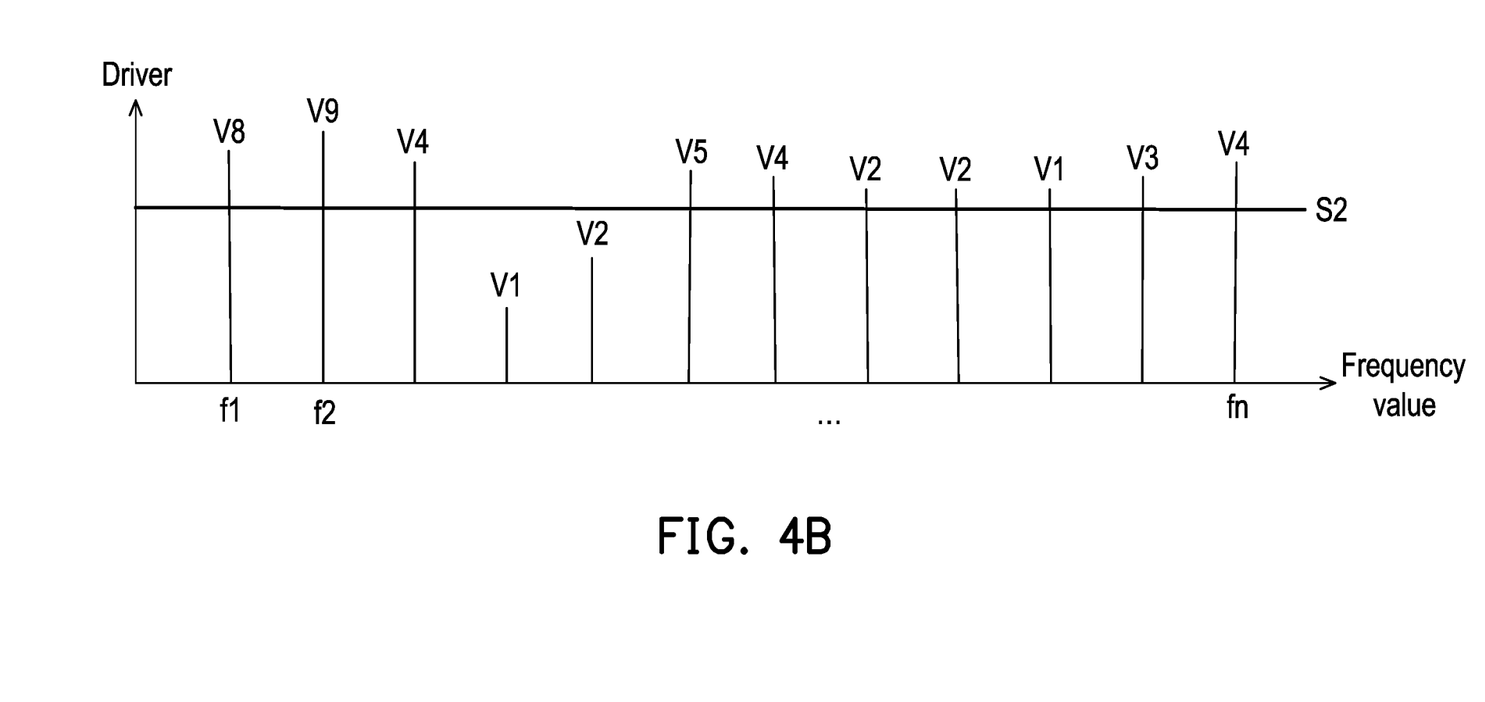
FIG. 4B is a schematic diagram of the operation of the control device after a correction procedure shown according to the embodiment of FIG. 1 of the invention.

Specifically, referring to FIG. 4B at the same time, FIG. 4B is a schematic diagram of the operation of the control device after a correction procedure shown according to the embodiment of FIG. 1 of the invention. In FIG. 4B, the horizontal axis is the setting frequency value of the driving signal S1, and the vertical axis is the setting voltage value of the driving signal S1 and/or the output strength value of the strength sensing information S2. In the present embodiment, for the setting frequency value f1, the processor 140 may bring the output strength value (i.e., the known and preset strength sensing information S2) into the corresponding first regression equation to obtain the setting voltage value (i.e., a voltage value V8). For the setting frequency value f2, the processor 140 may bring the same output strength value into the corresponding second regression equation to obtain the setting voltage value (i.e., a voltage value V9), and so on. At this time, the strength sensing information S2 may include the same output strength value corresponding to different setting frequency values f1 to fn.

It should be noted that, in the embodiment of FIG. 4B, for the different setting frequency values f1 to fn, the driving signal S1 may have different voltage values V1 to V9 so that the strength sensing information S2 is a constant value. That is, the strength of the vibration of the vibrator 110 generated according to the driving signal S1 with different electrical energies and vibration frequency is the same.

Figure 5A:
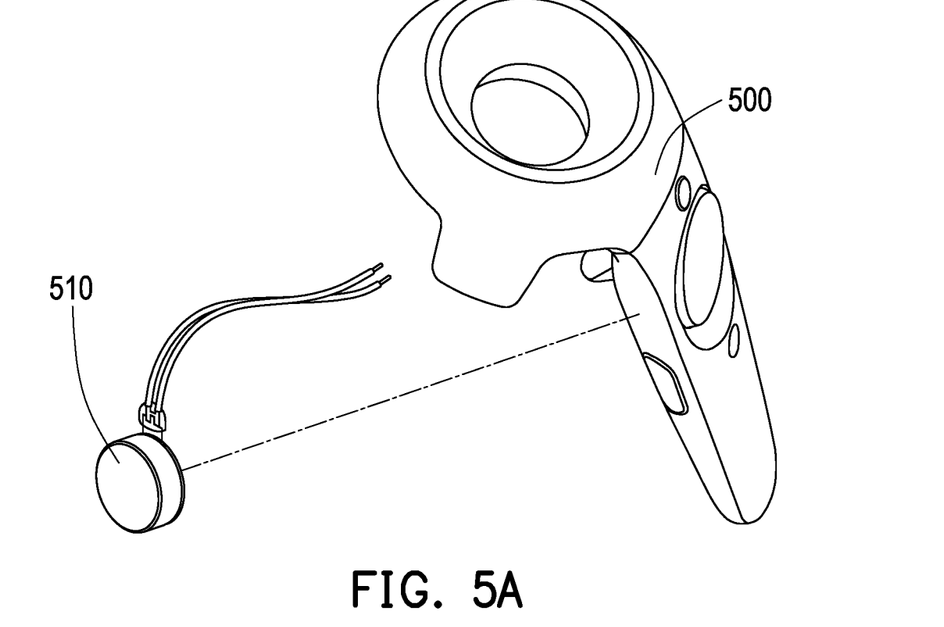
FIG. 5A is a schematic diagram of a control device shown according to an embodiment of the invention.
Figure 5B:
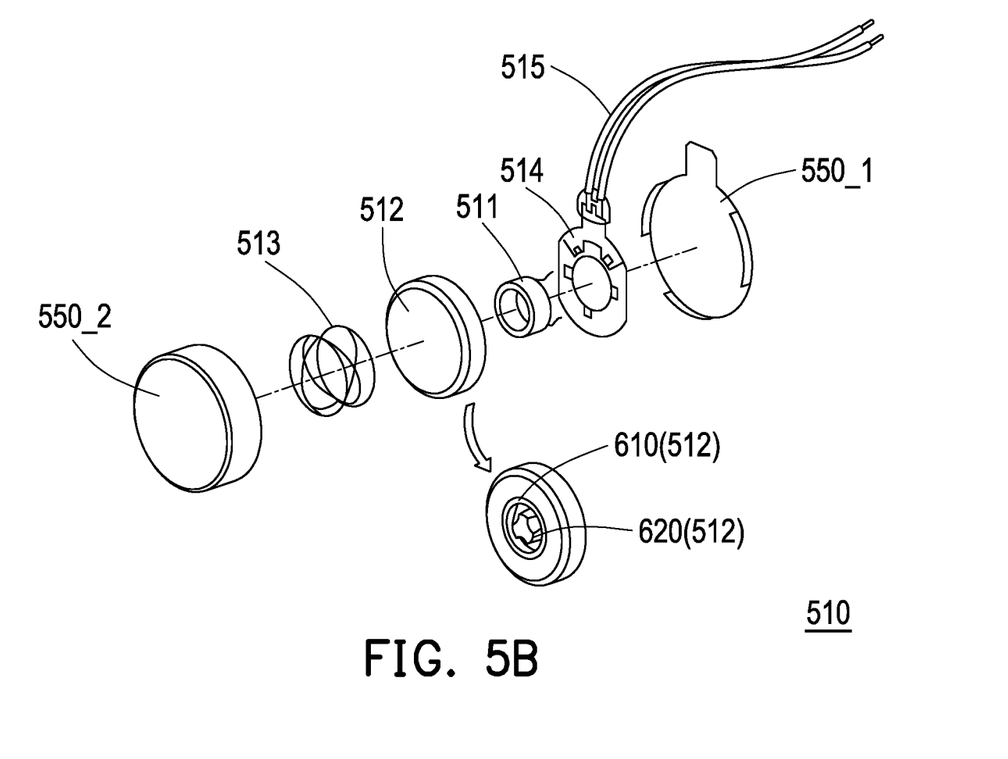
FIG. 5B is an exploded view of a vibrator 510 shown according to the embodiment of FIG. 5A of the invention.

FIG. 5A is a schematic diagram of a control device shown according to an embodiment of the invention. FIG. 5B is an exploded view of a vibrator 510 shown according to the embodiment of FIG. 5A of the invention. Please refer to FIG. 5A and FIG. 5B, a control device 500 and the vibrator 510 and carriers 550_1 to 550_2 included in the control device 500 are as provided in the relevant descriptions of the control device 100 and analogized as such, and are therefore not repeated herein.

In the present embodiment, the vibrator 510 may be disposed between the carrier 550_1 and the carrier 550_2. The vibrator 510 may include a coil 511, a weight block 512, and a spring 513. The coil 511, the weight block 512, and the spring 513 are sequentially in contact with and disposed in the carriers 550_1 to 550_2.

In the present embodiment, the coil 511 may receive a driving signal (e.g., the driving signal S1 of FIG. 1) and thereby generate vibration. In the present embodiment, the weight block 512 may include a neodymium magnet 610 and a voice coil yoke 620. The voice coil yoke 620 surrounds the neodymium magnet 610. The weight block 512 may be, for example, a voice coil actuator/voice coil motor to generate vibration via the electromagnetic field generated by the coil 511. In the present embodiment, the spring 513 may produce a damping effect when the coil 511 and the weight block 512 vibrate.

The vibrator 510 may further include a flexible printed circuit (FPC) 514 and a cable 515. The FPC 514 is coupled to the coil 511 and the cable 515. The FPC 514 may transmit the driving signal to the coil 511 via the cable 515.

Based on the above, the control device and the correcting method of the control device with the strength feedback function according to an embodiment of the invention may calculate the relationship between the setting voltage values and the setting frequency values corresponding to the setting output power value (i.e., strength sensing information) via the setting voltage values, the setting frequency values, and the strength sensing information obtained by the plurality of correction procedures. Therefore, the control device may output fixed strength sensing information at different electrical energies and/or vibration frequencies, so as to improve the accuracy and consistency of the user's feeling of strength.

Although the invention has been described with reference to the above embodiments, it will be apparent to one of ordinary skill in the art that modifications to the described embodiments may be made without departing from the spirit of the disclosure. Accordingly, the scope of the disclosure is defined by the attached claims not by the above detailed descriptions.

What is claimed is:

1. A control device with a strength feedback function, comprising:
   a vibrator;
   a driver coupled to the vibrator and respectively providing a driving signal with a plurality of different setting voltage values to the vibrator in a plurality of correction procedures, and in each of the correction procedures, the driver adjusts a frequency of the driving signal to a plurality of setting frequency values by time division;
   a strength sensor sensing a strength generated by a vibration of the vibrator in the correction procedures to obtain a plurality of strength sensing information respectively corresponding to the setting voltage values; and
   a processor coupled to the driver and the strength sensor to analyze the strength sensing information, the setting frequency values, and the setting voltage values to obtain relationship information between the setting frequency values and the setting voltage values corresponding to each of the strength sensing information.

2. The control device of claim 1, wherein the processor respectively corresponds to the setting frequency values to set a plurality of regression equations, and the processor calculates a plurality of coefficients of each of the regression equations according to the strength sensing information corresponding to each of the setting frequency values at the setting voltage values.

3. The control device of claim 2, wherein the processor stores the coefficients to obtain a correction matrix.

4. The control device of claim 1, wherein the processor, based on a reference voltage, generates the setting voltage values according to a plurality of setting ratios respectively.

5. The control device of claim 1, wherein the processor calculates an output strength value according to a median of the strength sensing information.

6. The control device of claim 5, wherein the processor calculates each of the setting voltage values corresponding to the output strength value at each of the setting frequency values.

7. The control device of claim 1, further comprising:
a carrier for accommodating the vibrator for providing the strength when the vibrator vibrates.

8. The control device of claim 7, wherein the vibrator comprises:
a coil, a weight block, and a spring disposed in the carrier, wherein the coil receives the driving signal and thereby generates a vibration.

9. A correcting method of a control device with a strength feedback function, comprising:
providing a driving signal with a plurality of different setting voltage values respectively to a vibrator in a plurality of correction procedures;
adjusting a frequency of the driving signal to a plurality of setting frequency values by time division in each of the correction procedures;
sensing a strength generated by a vibration of the vibrator to obtain a plurality of strength sensing information corresponding to the setting voltage values; and
analyzing the strength sensing information, the setting frequency values, and the setting voltage values to obtain relationship information between the setting frequency values and the setting voltage values corresponding to each of the strength sensing information.

10. The correcting method of claim 9, further comprising:
setting a plurality of regression equations corresponding to the setting frequency values respectively; and
calculating a plurality of coefficients of each of the regression equations according to the strength sensing information corresponding to each of the setting frequency values at the setting voltage values.

11. The correcting method of claim 10, further comprising:
storing the coefficients to obtain a correction matrix.

12. The correcting method of claim 9, further comprising:
generating the setting voltage values according to a plurality of setting ratios respectively based on a reference voltage.

13. The correcting method of claim 9, further comprising:
calculating an output strength value according to a median of the strength sensing information.

14. The correcting method of claim 13, further comprising:
calculating each of the setting voltage values corresponding to the output strength value at each of the setting frequency values.

* * * * *